United States Patent [19]
Taylor

[11] 3,936,983
[45] Feb. 10, 1976

[54] SANDING FIXTURE FOR PRODUCING CIRCULAR PARTS

[76] Inventor: Donald M. Taylor, 2400 Mardel Court, Hamilton, Ohio 45014

[22] Filed: Mar. 19, 1975

[21] Appl. No.: 559,927

[52] U.S. Cl. ............... 51/216 T; 51/240 T; 269/50
[51] Int. Cl.² ........................................ B24B 41/06
[58] Field of Search ........ 51/216 R, 216 T, 216 LP, 51/237 R, 240 T, 132; 125/135; 269/47, 48, 50, 51, 58; 144/208 A

[56] References Cited
UNITED STATES PATENTS

| 1,109,405 | 9/1914 | Digianni | 51/237 R |
| 1,358,998 | 11/1920 | Stauder | 51/216 T X |
| 2,707,419 | 5/1955 | Schron | 269/47 |

*Primary Examiner*—Al Lawrence Smith
*Assistant Examiner*—Nicholas Godici
*Attorney, Agent, or Firm*—Robert E. Luetje

[57] ABSTRACT

This invention relates to a device useful in making circular shapes of predetermined size on power sanding machines and the like. The device is essentially a fixture which enables a workpiece to be located on an adjustable center so that it can be rotated with respect to a driven sanding disc, polishing wheel, or similar abrasive tools. The device also permits an oversize workpiece to be fed into the sanding disc until the predetermined radius is reached.

4 Claims, 2 Drawing Figures

SANDING FIXTURE FOR PRODUCING CIRCULAR PARTS

BACKGROUND OF THE INVENTION

Circular

In order to produce a circular part on ordinary home shop equipment, it is necessary to mark a circle of the desired radius on the workpiece, perhaps cut it roughly to shape with a saw, and attempt to sand to the line on a disc sander while positioning the work by hand. It is essentially impossible to produce circular parts without flat spots and to produce duplicate parts.

Circular parts can be produced on tools where the work is rotated against a sanding block but equipment such as lathes and drill presses are not always available. Furthermore, it may be difficult to secure the work to the driving means and to control the finished dimension of the circular parts.

SUMMARY OF THE INVENTION

The circle forming fixture of this invention, hereinafter referred to as the "fixture," permits the production of truly circular parts on common power disc sanders that are widely available in private workshops. While it has primary utility in the production of wooden discs and will be described as such, it also can be used with other materials and with power equipment or tools other than sanders such as polishers, grinders, rotary rasps and other rotary abrasive wheels.

This fixture is especially adapted to be used with disc sanders which consist of a work table and a driven sanding disc adjacent to or extending through the table. Such tables ordinarily have a slot for a miter gage which may be utilized by this invention.

A primary object of this invention is to provide a simple fixture which facilitates production of circular parts on disc sanders and the like.

Another object of this invention is to provide a means for indexing the work so that the desired radius can be produced and reproduced.

The invention also has the objective of being adjustable for various radii.

Yet another objective is to permit a workpiece which is irregular and oversize to be fed into the sanding disc until a positive stop determines final radius.

An object of the preferred embodiment of this invention is to allow use of the full surface of the sanding disc without losing control of workpiece radius.

Still another object is to permit safe mounting and feeding of a workpiece on power sanding equipment.

Description Of The Preferred Embodiment

Figure 1:
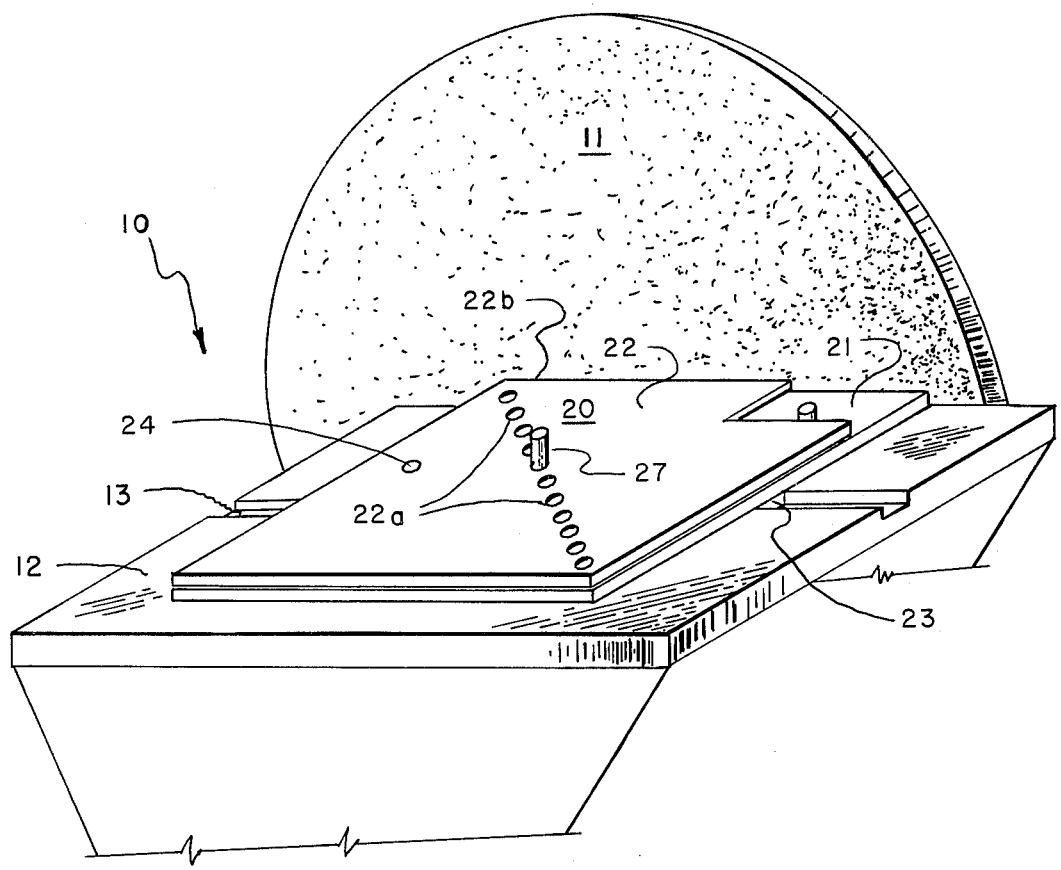
FIG. 1 is a perspective view of a power disc sander with which this invention may be used, showing the fixture of this invention positioned on it.

The fixture of this invention is adapted for use with a disc sander such as shown at 10 in FIG. 1. Machines of this type consist of a driven sanding disc 11 which rotates in a fixed plane relative to the work supporting table 12. The table 12 is normally fitted with a slot 13 which is parallel to the plane of the sanding disc. The slot is provided for the use of a miter gage but may also be used to position the novel fixture of this invention.

Figure 2:
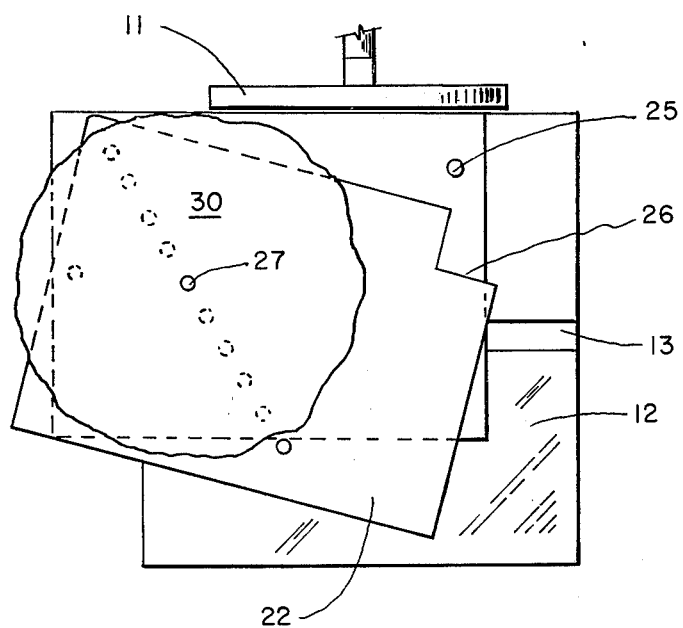
FIG. 2 is a plan view of the disc sander and the fixture of the present invention showing the initial position of a rough workpiece. The relative proportions of the parts are intentionally different from FIG. 1.

The fixture of this invention is shown generally as 20 in FIG. 1. It consists of two basic plates, the base 21 and the platen 22. The base 21 preferably has a raised rib 23 on the underside which is adapted to locate the fixture in the slot 13 of table 12. The platen 22 is pivoted to the base 21 by pin 24. It will be clear from the Figure that pivotal movement of the platen will be parallel to table 12. The extent of pivotal movement of the platen 22 toward the disc 11 is limited by a projection 25 on the base 21 which engages shoulder 26 on the platen 22 as shown in FIG. 2. The platen also has a number of holes 22a located varying distances from the front edge 22b of said platen. An adjustable center or work-mounting pin 27 may be located in any desired hole to determine the radius of the finished circular workpiece.

The device is used in the following manner with reference to FIG. 2. A workpiece 30 is provided with a hole sized to match the work-mounting pin 27 and roughly cut to a size larger than the desired final radius. The work-mounting pin 27 is located in the desired hole of the platen 22 and the fixture is positioned in slot 13 on table 12. Then the platen is pivoted away from the sanding disc 11 far enough to permit the workpiece 30 to be positioned on work-mounting pin 27. The platen 22 is then pivoted toward the rotating sanding disc 11 until the workpiece engages the sanding disc. Pivoting continues until projection 25 contacts shoulder 26 thereby determining final workpiece radius. Then the workpiece is rotated on work-mounting pin 27 until the entire periphery has been sanded to the same radius. It will be apparent that sliding the fixture back and forth in slot 13 will not change workpiece radius but will utilize various parts of the sanding disc surface.

It will be clear that many changes may be made in the fixture without departing from the spirit of the invention. For example, the positive stop means shown as projection 25 and shoulder 26 could take the shape of a flange or a projection other than a pin. Also, the projection could be fixed to either the base or the platen so long as it is located in such a way as to limit desired the degree of pivot.

The fixture can produce eliptical or cam or other arcuate shaped parts rather than circular parts if two or more centering holes are used on the workpiece.

It will be apparent that the fixture would be usable without the rib 23. While the rib is most convenient for tables having a miter slot and does permit maximum use of disc surface, the fixture could be securely located on the table using dowels, tacks, clamps or the like.

Each of the holes in the platen may be marked with the radius or diameter part they will produce. If a part size intermediate two holes is desired, a shim may be placed between the projection 25 and shoulder 26. This will change the indexing location yet permit use of the device in a normal manner.

I claim:

1. A fixture for producing circular parts for use in conjunction with an abrasive wheel or the like; said fixture consisting essentially of; a base including means for positioning said fixture a fixed distance from said abrasive wheel, a pivot pin joining said base and a platen for pivotal movement, said platen having a plurality of work-mounting pin locations with a work-mounting pin positioned in one of said locations for mounting a workpiece center for rotation thereupon, and positive stop means which limits the degree of pivotal movement of the platen with respect to the base.

2. The fixture of claim 1 wherein said positioning means is a raised rib on the base adapted to engage a worktable miter slot.

3. A work holding fixture to facilitate the production of circular parts on the worktable of a disc sander or the like, said fixture including:
   a. a base having means to position said fixture on said worktable,
   b. a platen, having a plurality of work-mounting pin locations, pivotally mounted to said base for pivotal movement in a plane parallel to said worktable,
   c. a work-mounting pin in one of said locations on said platen and
   d. positive stop means to limit the degree of pivotal movement between said base and platen whereby a workpiece may be mounted on said work-mounting pin, said platen pivoted to the degree permitted by the positive stop means and the workpiece rotated on said work-mounting pin against a tool to produce a circular part.

4. The work holding fixture of claim 3 wherein said means to position said fixture on said worktable comprises a rib proportioned to engage and slide in a worktable miter slot.

* * * * *